United States Patent [19]

Gaskill, Jr.

[11] 3,903,405

[45] Sept. 2, 1975

[54] VARIABLE THRESHOLD DIGITAL CORRELATOR

[75] Inventor: James R. Gaskill, Jr., Pacific Palisades, Calif.

[73] Assignee: Hughes Aircraft Company, Culver City, Calif.

[22] Filed: Mar. 11, 1974

[21] Appl. No.: 450,017

[52] U.S. Cl. .................................. 235/152; 235/181

[51] Int. Cl.[2] ........................................... G06F 15/34

[58] Field of Search ..... 235/152, 181; 340/146.3 Q, 340/146.2

[56] References Cited

UNITED STATES PATENTS

| | | | |
|---|---|---|---|
| 3,720,821 | 3/1973 | Heightley | 235/172 |
| 3,796,868 | 3/1974 | Kaul et al. | 235/181 |
| 3,818,348 | 6/1974 | Puente | 235/181 X |

*Primary Examiner*—David H. Malzahn
*Attorney, Agent, or Firm*—W. H. MacAllister; Lawrence V. Link, Jr.

[57] ABSTRACT

Herein is disclosed a circuit adapted for determining whether or not the number of corresponding bits in two parallel arrays of binary signals, which are of the same binary state, exceeds a preselected number. In accordance with one embodiment of the invention, a parallel array of cascode logic circuits is employed wherein each cascode circuit provides differential currents which are indicative of whether or not two applied bits, one from each signal array, are of the same binary state. Differential output currents from a programmable current source are summed with the differential currents from the cascode circuits and the resultant sum signal is applied to a comparator circuit whose output signal is indicative of whether the degree of correspondence between the two arrays exceeds a level determined by the programmable current source.

10 Claims, 5 Drawing Figures

Cascode Circuit Unit

VARIABLE THRESHOLD DIGITAL CORRELATOR

BACKGROUND OF THE INVENTION

This invention relates generally to thresholding circuits and more particularly to such circuits for establishing whether or not a selected degree of correspondence exists between first and second arrays of binary signals.

In numerous data processing applications it is necessary to establish whether or not a selected degree of correspondence exists between first and second arrays of binary signals. For example, the first array of binary signals, $f(x)$, may be considered a test function; the second array of binary signals, $g(x)$, the reference function or "vector"; and the required degree of correspondence is determined by the threshold level, T. One application for such a thresholding circuit wherein the reference vector and the threshold level are preferably programmable at the circuit's nominal processing rate, is in identification systems. In this type of system, a match within a selected degree between corresponding bits of two arrays of binary signals confirms the identification of the source of the signals of one of the arrays. The threshold level is set to allow for discrepancies resulting from the transmission, reception and processing of the signals of the first array. In such an application it would be desirable to be able to rapidly program the reference vector, $g(x)$, which corresponds to the code of the selected aircraft in a traffic control situation. Also since the inaccuracies in the received binary signal array (e.g. due to "noise") is a function of the range of the aircraft being interrogated, the threshold level, i.e. the degree of correspondence required for confirmation, might be programmed as a function of the range of the aircraft being interrogated.

A second example of an application of such a thresholding gate is in correlation processors, such as those implementing the unit delay Walsh function, wherein it is necessary to determine whether the inner product of two binary arrays, i.e. whether $\int f(x)g(x)dx$, is equal to or exceeds a threshold level. In this implementation the two binary states are considered as +1 and −1 and the just listed calculation is the same as determining whether or not a selected degree of correspondence exists between first and second binary signal arrays.

Further, in keeping with the requirements for high speed, small volume, and low power consumption of modern day processors it is preferable that the above described thresholding or inner product gate function be capable of large scale integration (LSI) implementations.

SUMMARY OF THE INVENTION

Hence it is a primary object of the subject invention to provide a new and improved programmable threshold gate.

Another object of the invention is to provide a new and improved circuit for forming the inner product of two binary signal arrays and producing an output signal indicative of whether the inner product exceeds a selected threshold level.

A further object is to provide a threshold gate circuit which is capable of high speed operation and in which both the reference vector and threshold level are programmable at the gate's nominal processing rate.

Still a further object is to provide an improved circuit for establishing whether or not a selected degree of correspondence exists between first and second binary signal arrays, and which is adaptable to high speed operations and to implementation by large scale integration techniques.

Thresholding gating circuits in accordance with the subject invention are adapted for responding to first and second parallel arrays of binary signals so as to provide an output signal indicative of whether or not the number of corresponding bits in the two arrays, which have the same binary state, exceeds a preselected number. In accordance with one embodiment of the invention, a parallel array of cascode circuits is provided in which each cascode circuit is adapted to receive one bit from each of the first and second parallel array of binary signals. Each cascode circuit includes a current switching arrangement wherein a selected value of current is conducted on a first output lead if the two applied bits are of the same binary state and the selected value of current is conducted on a second output lead if the two applied bits are of different binary states. A differential current source having first and second output leads is provided, as well as means for forming the sum of the currents conducted on the first output leads of each of the cascode circuits and the differential current source, and for forming a second sum signal for the current conducted on the second output leads of each of the cascode circuits and the differential current source. The current sum signals are each fed to load resistors and the differential voltage developed may be clamped by a pair of oppositely directed diodes connected across the two load resistor nodes. The voltages at each node may then be fed to emitter follower transistors possibly in conjunction with level shifting diodes to produce a pair of complement output signals. In other embodiments, a differential comparator compares the magnitude of the first and second sum signals and provides an output signal as a function of which sum signal is larger. This output signal is indicative of whether or not the number of corresponding bits of like binary state in the two arrays exceeds the preselected number as established by the value of the current supplied from the differential source. In accordance with one preferred embodiment, the differential current source is readily programmable at the nominal data rate of the gating circuit; and the cascode circuits are provided with idle current injection, implemented by means of "keep alive" diode circuitry, so as to enhance the operating speed of the assembly. Also the signals from the cascode circuits and the differential current source are summed by means of a common base transistor stage to further reduce the response delay of the assembly.

Additional objects, advantages and characteristic features of the present invention will become readily apparent from the following detailed description of preferred embodiments of the invention when considered in conjunction with the accompanying drawings.

DESCRIPTION OF THE PREFERRED EMBODIMENTS

Figure 2:
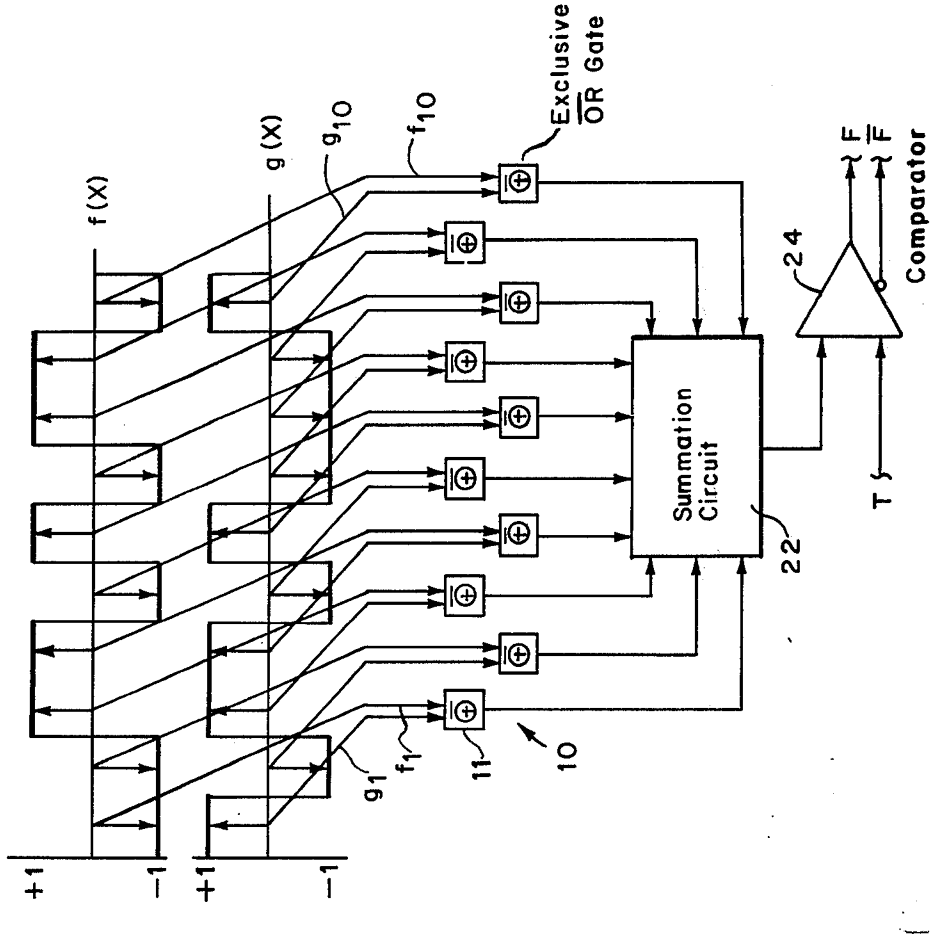
FIG. 2 is a diagram for explaining the logic type functions implemented by means of the subject invention.

The structure and operation of the subject invention may be more readily understood by first referring to the diagram of FIG. 2 which illustrates how two parallel arrays of binary signals, $f(x)$ and $g(x)$ may be compared to provide an output signal indicative of whether or not the number of corresponding bits in the two arrays which have the same binary state exceeds a preselected number. As there shown, corresponding bits from each of the two arrays are applied as input signals to an array 10 of logic gates such that each of the gates receives 2 bits (one from each array). For example, the first bit from each array, $f_1$ and $g_1$, are applied to gate 11 and the last bits of each of the two arrays, i.e. $f_{10}$ and $g_{10}$ are applied to gate 20. The logic gates of array 10 implement the complimentary exclusive "OR" function and are designated in FIG. 2 by the symbol "$\overline{\oplus}$" For example, gate 11 implements $\overline{f_1 \oplus g_1}$. The output from the gates of array 10 may be considered to apply a unit output current if the two applied binary signals are of the same state and a substantially zero current if the applies signals are of different binary states. The output signals from the gates of array 10 are summed by means of circuit 22 which provides a summation output current to comparator 24. The other input to comparator 24 is the threshold signal T and the output of comparator 24 is at the high or true level if the summation signal from unit 22 exceeds the threshold signal, T. For example, the threshold signal could be set equal to 7.5 times the output current from an individual one of the gates of array 10, in which case comparator 24 will provide a high output signal if 8 or more corresponding bits of the parallel arrays of binary signals, $f(x)$ and $g(x)$ are of the same binary state. Hence, comparator 24 provides a high output signal F, if $\int f(x)g(x)dx \geq T$.

Figure 1:
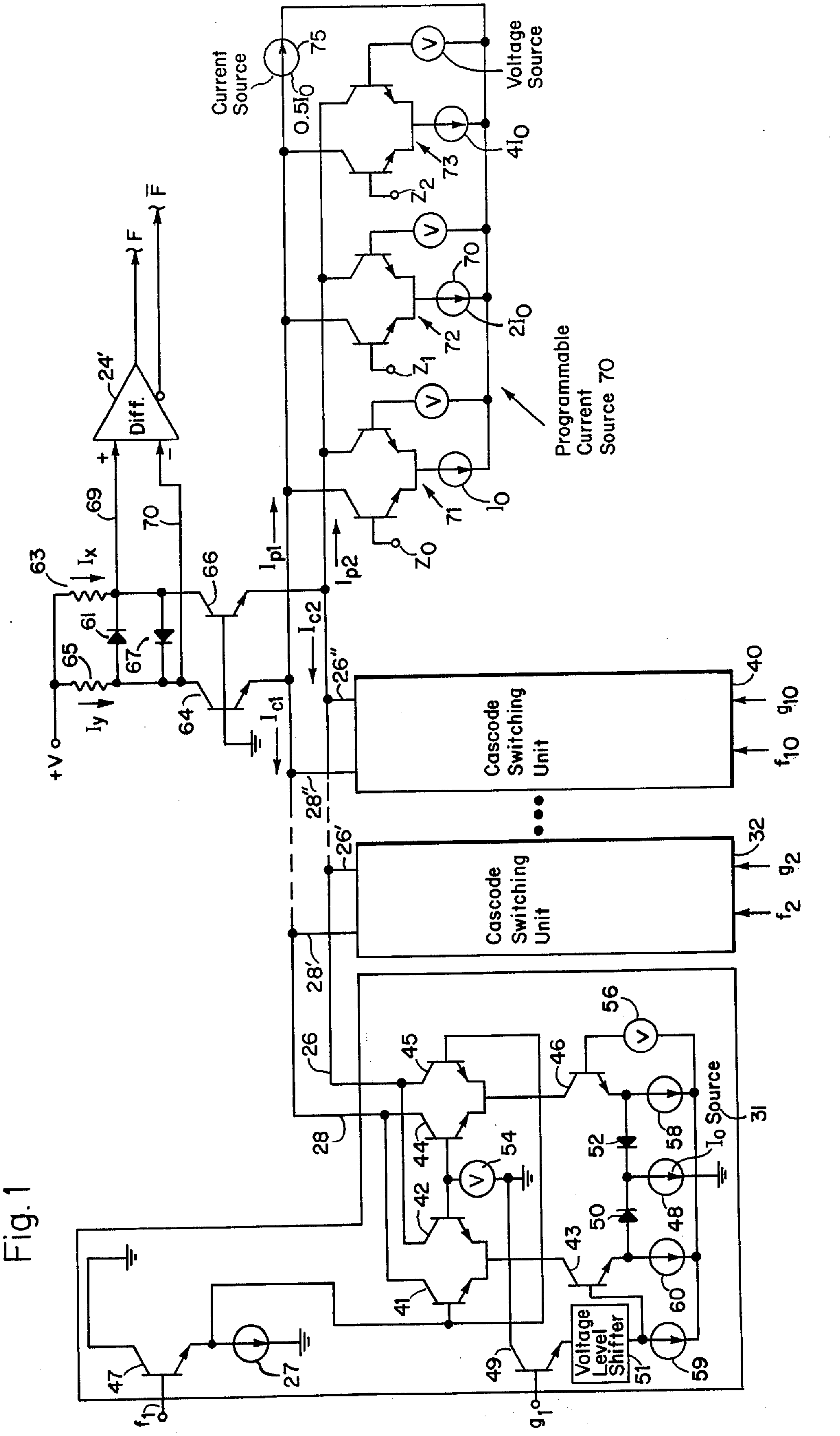
FIG. 1 is a simplified schematic and block diagram of one embodiment of a programmable threshold gate in accordance with the subject invention.

Reference is now directed primarily to FIG. 1 which depicts a simplified schematic and block diagram of one embodiment of a programmable threshold or inner product gate in accordance with the invention. As there shown, an array of cascode circuits 31, 32 . . . 40 are provided, with each cascode circuit adapted to receive one binary input signal from each of the two parallel arrays of binary signals. The two signals (one from each array) whose binary states are to be compared to each other's are applied to the same cascode circuit. For example, the first bit from the parallel arrays of binary signals $f(x)$ and $g(x)$, i.e. $f_1$ and $g_1$, are applied as input signals to cascode circuit 31; the second bits $f_2$ and $g_2$ to cascode circuit 32; and the last bits $f_{10}$ and $g_{10}$ to cascode circuit 40.

Each of the cascode circuits 31, 32, . . . 40 are identical in their structure and operation and hence only circuit 31 is shown in detail. Also, it is noted that although only cascode circuits 31, 32 and 40 are shown, either schematically or in block form in FIG. 1, that for the illustrative example of signal arrays $f(x)$ and $g(x)$ it is understood that identical cascode circuits 33 through 39 are implemented.

Now considering cascode circuit 31 in greater detail, transistors 41 through 46 are coupled in a current switching arrangement such that a switching current $I_0$ is steered through the "tree" formed by these transistors so as to implement the "exclusive OR" function, i.e., $f_1 \oplus g_1$. For example, if signals $g_1$ and $f_1$ are of the same binary state the switching current $I_0$ is conducted on lead 26; and if the signals $f_1$ and $g_1$ are different binary states the current $I_0$ is conducted on lead 28. In particular, if the signals $f_1$ and $g_1$ are both high the current $I_0$ is conducted from lead 26 through transistors 45 and 46 and diode 52 to current source 48; and if the signals $f_1$ and $g_1$ are both low the switching current $I_0$ is conducted from lead 26 through transistors 42 and 43 and diode 50 to switching current source 48. On the other hand when the signal $f_1$ is high and the signal $g_1$ is low the switching current $I_0$ is conducted from lead 28 through transistors 41 and 43 and diode 50 to the current source 48; and when the signal $f_1$ is low and the signal $g_1$ is high the switching current $I_0$ is conducted from lead 28 through transistors 44 and 46 and diode 52 to current source 48.

The term "cascode" is indicative of a class of circuits which is characterized by the emitter (or emitters) of a first transistor stage being series coupled to the collector of a second transistor stage. For example in unit 31 the common emitters of transistors 41 and 42 are series coupled to the collector of transistor 43 to form a first cascode arrangement; and the common emitters of transistors 44 and 45 are series coupled to the collector of transistor 46 to form a second cascode arrangement.

The signal $f_1$ is applied to the bases of transistors 41 and 45 by means of transistor circuit 47 and the signal $g_1$ is applied to the base of transistor 43 by means of transistor circuit 49. Voltage level shifter 51 shifts the signals coupled therethrough to the preferred voltage range for the control of transistor 43. Voltage level shifter 51 is shown in greater detail in FIG. 4.

The voltage source 54 is selected such that when the signal $f_1$ is low the switching current $I_0$ is conducted through transistors 42 or 44 depending on the bias condition of transistors 43 and 46. The voltage source 56 is selected such that the switching current $I_0$ is conducted through transistor 46 during the time period that the signal $g_1$ is high. Throughout the drawings a voltage source is designated by a circled V and a current source by a circled arrow.

Current sources 58 and 60 in conjunction with diodes 50 and 52 provide for a small amount of "idle" current to flow through the transistors of the cascode circuit so that the transistors operate at all times in an active region instead of operating between the cutoff and active regions. When the transistors remain in the active operating region and are subjected to a switching transient the parasitic capacitance associated with emitter, base and collector, base junctions are not charged and discharged to the same extent that they would otherwise. Moreover if the transistors are held on, delay required for minority "profile buildup" in the base region of the transistors is reduced; and consequently, the propagation delay is reduced. Also, it is noted that by applying idle current injection to the lower stages, i.e. those of transistors 43 and 46, the transient operation of the lower current switch is improved. This reduces the otherwise slightly longer delay of the lower switching stage and allows for a more symmetrical operation of the upper and lower stages. These latter two factors, in conjunction with the effects of idle current on the transistors of the upper stages of cascode circuit 10, reduce the spurious cascode "glich" associated with other switching circuits.

"Keep alive" diodes 50 and 52 operate to either conduct or block the flow of the switching current $I_0$ from the source 48 as determined by the state of the input signals. When one of the keep alive diodes is cut off and blocking the flow of switching current $I_0$, current from the associated idle current source, 58 or 60, nonetheless flows through the emitter of the transistor of the lower switching stage not conducting the switching current and thereby keeps it "turned on" so as to achieve the advantages noted hereinabove. Also it is noted that the idle current, which flows in the transistor stage of the lower current switch that is not conducting switching current $I_0$, is transferred through the collector of that transistor to the common emitter junction of the associated upper current switch. This allows for the transistors of the upper current switch to always be maintained in the active region with the resulting increase in performance noted above. For high speed switching applications keep alive diodes 50 and 52 are preferably implemented by Schottky type diodes.

Additional advantages of the effects of idle current injection for both the upper and lower switching stages of the cascode circuit are described in U.S. patent application Ser. No. 450,019, filed Mar. 11, 1974, entitled "Diode Controlled Idle Current Injection" by James R. Gaskill, Jr. and Donald C. Devendorf and assigned to the assignee of the subject invention.

In a similar manner switching current having a magnitude $I_0$ will be conducted on lead 26' if the signals $g_2$ and $f_2$ applied to cascode circuit 32 are of the same binary state; and the switching current will be conducted on lead 28' if the applied signals are of opposite binary states. As noted above, the operation of each of the cascode circuits of the array is identical and hence circuit 40 will have switching current $I_0$ conducted on a lead 28'' if the applied signals $f_{10}$ and $g_{10}$ are of like binary states; and the current $I_0$ will be conducted on the second input lead 28'' if the applied binary signals are of opposite states.

Still referring primarily to FIG. 1, it is noted that the switching currents from the output lead of each of the cascode stages identified by reference numeral 28 is supplied in parallel from the emitter of a common base transistor stage 64; and that the collector of this common base transistor stage is coupled to the positive input of a high gain differential amplifier 24'. The output lead from each of the cascode circuits identified by the reference numeral 26 is coupled in parallel to the emitter of a common base transistor stage 66 and the collector of this stage is coupled to the negative input of differential amplifier 24'.

In FIG. 1 the current supplied by common base transistor stage 64 to the cascode circuits 31–40 is designated $I_{c1}$; and the current supplied by common base transistor stage 66 to the cascode circuits 31–40 is designated $I_{c2}$. Amplifier 24' may be any suitable device which provides an output of a first preselected level when the signal applied to its input terminal 69 is more positive than the signal applied to terminal 70. For example, for resistors 63 and 65 being of the same value the output signal from amplifier 24' is positive (sometimes hereinafter referred to as the true level) if the current $I_x$ flowing in transistor stage 66 is greater than the current $I_y$ flowing in transistor stage 64. Diodes 61 and 67, limit the maximum voltage level applied across input terminals 69 and 70 of amplifier 24' so as to avoid the increased time delay which would result from "overdriving" amplifier 24'. As will be explained subsequently, the programming section 70 provides a current offset equal to $0.5 I_0$ so as to avoid the ambiguous case of $I_x = I_y$.

Considering now the threshold level programming section shown on the right side of FIG. 1, an array 70 of switching circuits 71, 72 and 73 are coupled such that the first output lead of each of the switching circuits is connected in parallel to the emitter of common base transistor stage 64, and the second output lead of each of the switching stages is connected in parallel to the emitter of common base transistor 66. The value of the current sources in the programming stages may be multiples of the switching current $I_0$ in the cascode circuits 31 through 40. For example, switching circuits 71, 72 and 73 may have switching current values of $2^0$ I , $2^1 I_0$, and $2^2 I_0$, respectively, so as to facilitate digital type programming of the threshold level. Current source 75 provides an offset of $0.5 I_0$ so as to avoid ambiguities in the thresholding operation. On this last point, it is noted that if all current sources are integer value of $I_0$ except for current source 75, then $I_x$ and $I_y$ cannot be equal.

In the operation of the threshold gate of FIG. 1, a true output signal is provided by amplifier 24' if the number of corresponding binary bits in the two signal arrays $f(x)$ and $g(x)$ which are of the same binary state exceeds, by the threshold level, the number of such bits which are of different binary states. In FIG. 1 the programming current coupled through common base transistor 64 is designated $I_{p1}$; the programming current coupled through common base transistor 66 is designated $I_{p2}$; and the thresholding level is $I_{p2}-I_{p1}$. For example, in the operation of the circuit of FIG. 1, if the input threshold control signals $Z_0$, $Z_1$ and $Z_2$ to programming circuits 71, 72 and 73 are 0, 1, 0, respectively, then $I_{p2}-I_{p1}$ is equal to $2.5 I_0$ and so for a true output from amplifier 24', $I_{c1}$ must exceed $I_{c2}$ by a value of $3I_0$. Stated differently, the two binary applied signal arrays $f(x)$ and $g(x)$ must have at least three more sets of corresponding bits which are of like binary states than there are sets of bits of different binary states. As a second example of a threshold level setting for circuits 71, 72 and 73, if the signals $Z_0$, $Z_1$, and $Z_2$ are 0, 0, 0, then $I_{p2}-I_{p1}$ is equal to $6.5 I_0$, and for this threshold level the signal arrays $f(x)$ and $g(y)$ must have at least seven more sets of corresponding bits which are of the like binary states, than there are such sets of bits having opposite binary states.

It will be readily apparent from the above description of the operation of the programming circuits of FIG. 1 that by the proper selection of the magnitude of the current sources in the programming stages and the number of the programming stages, the threshold level for the circuit of FIG. 1 may be digitally programmed to any desired threshold level. Other advantages and characteristics of such a programming circuit are disclosed in U.S. patent application Ser. No. 450,016, filed Mar. 11, 1974, entitled "Programmable ECL Threshold Logic Gate," by James R. Gaskill, Jr. and Donald C. Devendorf and assigned to the assignee as the subject application.

Figure 3:
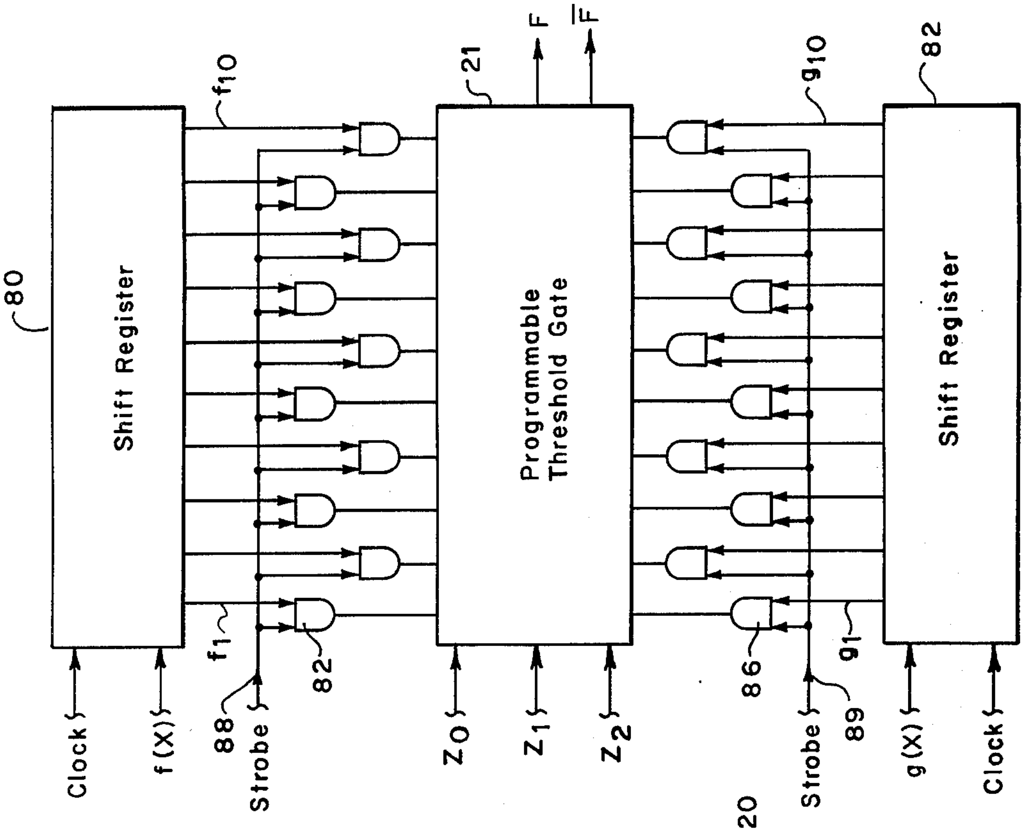
FIG. 3 is a block diagram of a portion of a processing system incorporating a programmable threshold gate in accordance with the invention, and is useful for explaining the interface of signals to the thresholding gate.

Reference is now momentarily directed to the block diagram of FIG. 3 for the purpose of further explaining the application of the signal arrays $f(x)$ and $g(x)$ and the threshold programming signals to the threshold gate 21 of FIG. 1. As shown in FIG. 3 a multistage shift register 80 is provided for receiving the signal array $f(x)$ which is serially loaded into the register. Each of the stages of shift register 80 are coupled through associated AND gates, such as AND gate 82 for bit $f_1$, to an associated one of the cascode circuits in thresholding gate circuit 21 (see FIG. 1). In a similar manner the second parallel array of binary signals $g(x)$ is loaded serially into shift register 82; and each of the bits of the array $g(x)$ is coupled through and associated AND gate, such as gate 86 for the first bit $g_1$; to its corresponding circuit of threshold gate 21. In accordance with the operation of the implementation of FIG. 3, the binary signal arrays of $f(x)$ and $g(x)$ are loaded into shift registers 80 and 82 in response to clock signals. Upon the completion of the loading, the corresponding bits of each of the signal arrays are applied to the associated stage of threshold gate 21 in response to the application of a strobe signal on control leads 88 and 89. It is noted that the signal loading and transfer techniques illustrated in FIG. 3 are only one example of a signal interface for threshold gate 21 and that numerous other suitable interface techniques will be readily apparent to those skilled in the art.

Figure 4:
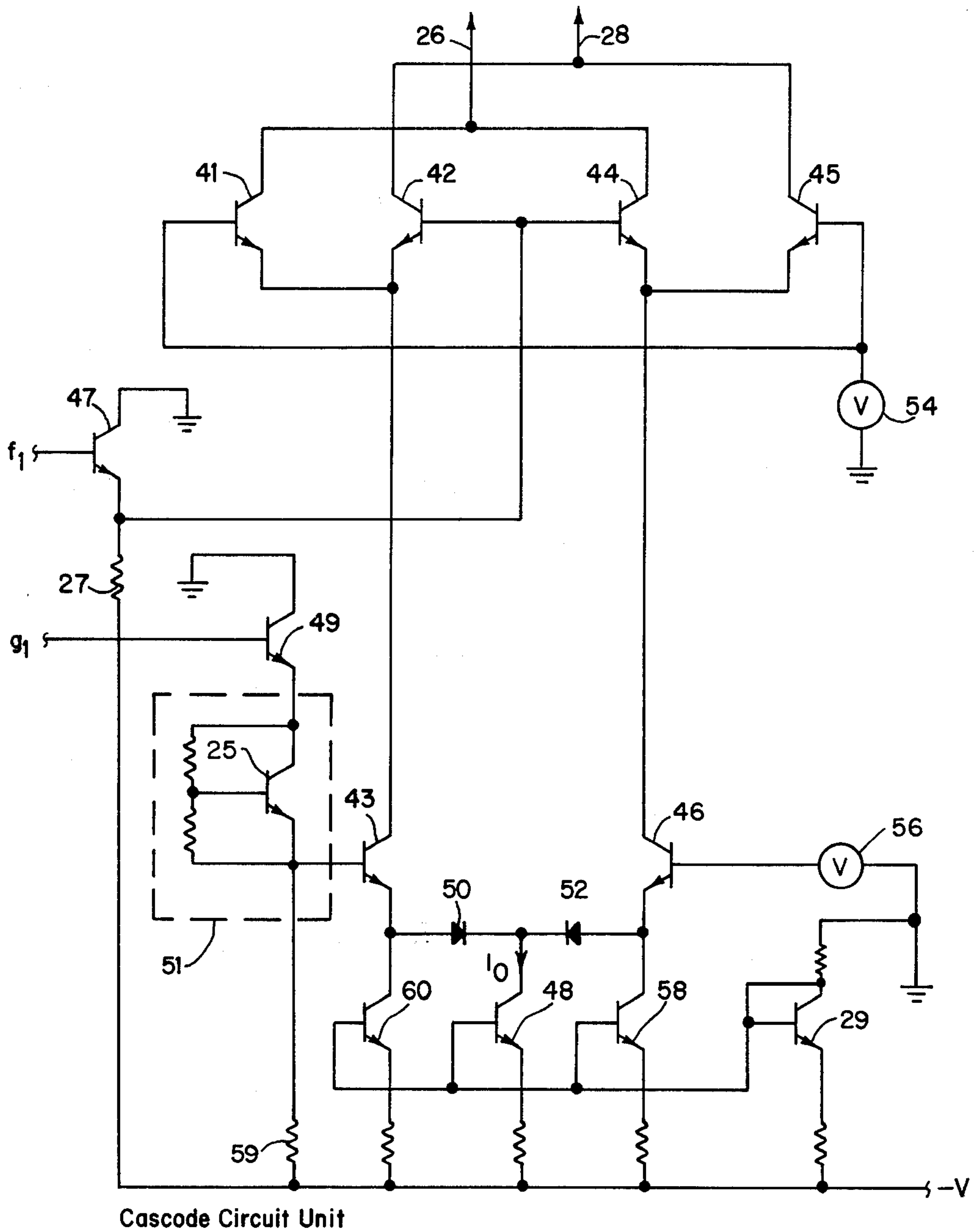
FIG. 4 is a schematic and block diagram showing one of the cascode current units of FIG. 1 in greater detail.

FIG. 4 shows the cascode switching unit 31 (FIG. 1) in greater detail. As shown in FIG. 4, current sources 60, 48 and 58 are implemented by transistor stages, which are biased by the current source reference circuitry associated with transistor 29. Transistor 29 is "diode" connected to "track out" variations in parameters of the transistors in the current source 60, 48 and 58. Voltage level shifter 51 comprises a transistor 25 with resistors connected between its base, collector and emitter so as to provide the desired voltage level shift, such as 1.2 volts, for example. Current sources shown as 59 and 27 in FIG. 1 are shown in FIG. 4 as implemented by means of large value resistors 27 and 59, connected to a negative voltage source "−V".

Figure 5:
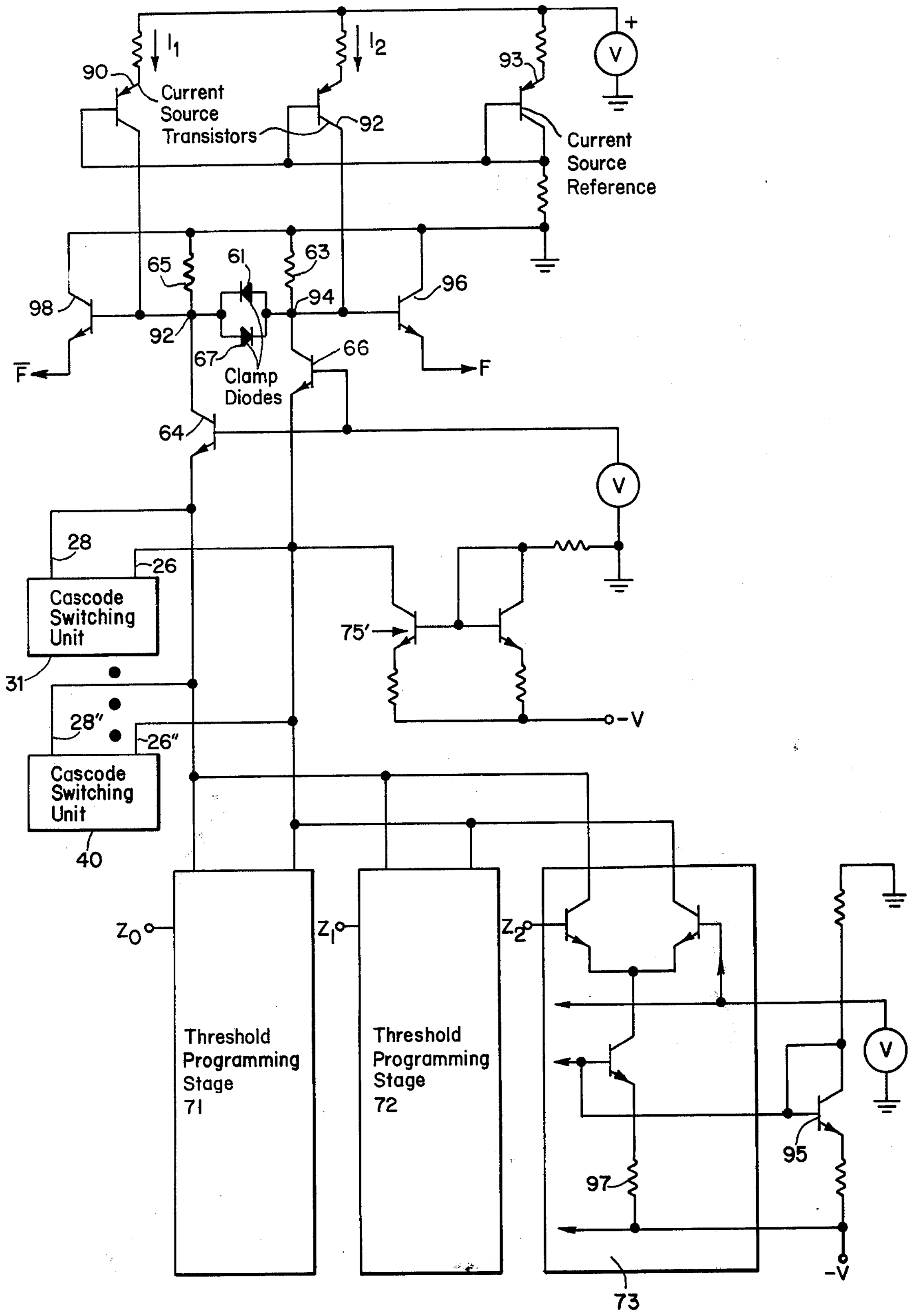
FIG. 5 is a schematic and block diagram of a second embodiment of the subject invention.

In the embodiment of FIG. 5 to which reference is now primarily directed, transistor, resistor combinations, 90 and 92 function as current sources which are connected to the collector of common base transistors 64 and 66 respectively. Current source reference stage 93 biases current sources 90 and 92 such that they provide preselected values of current. For example, if there are N cascode switching circuits in a particular embodiment then $I_1$ and $I_2$ may each be $NI_0/2$. Diodes 61 and 67 function to clamp the maximum voltage magnitude between current nodes 92 and 94 to a preselected value, such as −0.8 volts for example.

In the embodiment of FIG. 5 "offset" current source 75' is implemented to provide a current offset value of $I_0$; and output signal F from emitter follower 96 is true if $I_{c2}-I_{c1}$ is equal to or greater than $I_{p2}-I_{p1}$. The output signal F from emitter follower transistor 98 is the complement of the signal from transistor 96. It is noted that in the embodiment of FIG. 5 that current sources 90 and 92 interact with the circuitry which includes diodes 61 and 67 so as to provide the funtion of comparator 24 without other specific implementation thereof.

Programming circuit 73 is shown in greater detail in FIG. 5 as comprising a current source implemented by circuitry which includes transistor 97, with the current source reference being supplied by the circuitry associated with "diode" connected transistor 95. The other stages of the threshold programming section 70, such as 71 and 72, for example, may be implemented by circuitry similar to that shown for stage 73. The same current source reference may be used for all threshold programming stages with the emitter resistor in the current source section of each being selected to provide the desired current value for each stage, e.g. $2^0I_0$, $2^1I_0$, $2^2I_0$, etc.

As noted hereinabove, programmable threshold gate 21 includes a differential current implementation with idle current injection "keep alive diode" circuitry in each of the cascode stages 31 through 40 (see FIG. 1); differential current programming adapted for digitally programming the threshold level; common base coupling means for forming the sum of the differential currents from the cascode stages and the programming stages. These techniques contribute to the improved high speed performance of programmable threshold gates in accordance with the subject invention and are readily adaptable to large scale integration configurations.

Although only a limited number of embodiments of the invention have been herein described and illustrated, it is recognized that in view of the above disclosure numerous modifications and variation within the scope of the invention may readily occur to those skilled in the art. In particular, although in the illustrated embodiment, the array of cascode switching units was described as comprising ten such units, it is noted that the invention is by no means restricted as to the number of units in the cascode switching array; and the invention is readily adaptable for operating with whatever member of units required for a given application. Similarly the programming unit 70 may comprise as many stages as is desired for a given application.

Thus having described a new and useful programmable threshold and inner product gate, what is claimed is:

1. A circuit adapted for responding to first and second parallel arrays of binary signals so as to provide an output signal indicative of whether or not the number of corresponding bits in the two arrays which have the same binary state exceeds a preselected number, said circuit comprising:

a parallel array of cascode circuit units with each unit adapted to receive one bit from each of said first and second parallel arrays of binary signals and including current switching means for providing a preselected value of switching current on a first output lead if the two applied bits are of the same binary state and on a second output lead if the two applied binary signals are of different binary states;

a programmable differential current source having first and second output leads;

means for forming a first sum signal indicative of the sum of the currents conducted on the first output lead of each of the cascode circuit units and the differential current source, and for forming a second sum signal indicative of the sum of the currents conducted on the second output lead of each of the cascode circuit units and the differential current source; and means for providing an output signal indicative of whether or not the value of the first sum signal exceeds that of the second sum signal.

2. The circuit of claim 1 wherein said differential current source is a digitally programmable differential current source.

3. The circuit of claim 1 wherein said current switching means of each of said cascode circuit units incorporates switching transistor stages and idle current injection means coupled to each of said stages for causing idle current to be conducted by those switching transistor stages which are not conducting switching current.

4. The circuit of claim 3 wherein said idle current injection means incorporates keep alive diode circuitry.

5. The circuit of claim 3 wherein said differential current source is a digitally programmable current source.

6. The circuit of claim 3 wherein said means for forming a first and second sum includes a first common base transistor stage having its emitter coupled in parallel to the first output lead of each of the cascode stages and the differential current source and a second common base transistor stage having its emitter coupled in parallel to the second leads of each of the cascode circuits and the differential current source, whereby the current flow through the collector leads of said first and second common base stages is representative of said first and second sum signals, respectively.

7. A circuit adapted for responding to first and second parallel arrays of binary signals so as to provide an output signal indicative of whether or not the number of corresponding bits in the two arrays which have the same binary state exceeds a preselected number, said circuit comprising:

a parallel array of cascode circuit units with each unit adapted to receive one bit from each of said first and second parallel arrays of binary signals and including current switching means for providing a preselected value of switching current on a first output lead if the two applied bits are of the same binary state and on a second output lead if the two applied binary signals are of different binary states, with said current switching means including switching transistor stages and means for causing idle current to be conducted by the switching transistor stages which are not conducting switching current;

a programmable differential current source having first and second output leads;

a first common base transistor stage coupled so as to form a first sum signal indicative of the sum of the currents conducted on the first output leads of each of the cascode circuits and the differential current source, and a second common base transistor stage coupled so as to form a second sum signal indicative of the sum of the currents conducted on the second output leads of each of the cascode circuits and the differential current source; and means for providing an output signal indicative of whether or not the value of the first sum signal exceeds that of the second sum signal.

8. The circuit of claim 7 wherein said differential current source is a digitally programmable differential current source.

9. The circuit of claim 7 wherein said means for causing idle current to be conducted includes keep alive diode circuitry.

10. The circuit of claim 9 wherein said differential current source is a digitally programmable current source.

* * * * *